US011479361B2

(12) United States Patent
Cueto-Gomez

(10) Patent No.: US 11,479,361 B2
(45) Date of Patent: Oct. 25, 2022

(54) LIGHTING SYSTEM FOR AN AIRCRAFT WITH MULTICHANNEL LENS

(71) Applicant: AIRBUS OPERATIONS, S.L.U., Madrid (ES)

(72) Inventor: Pablo Cueto-Gomez, Getafe (ES)

(73) Assignee: AIRBUS OPERATIONS, S.L.U., Madrid (ES)

(*) Notice: Subject to any disclaimer, the term of this patent is extended or adjusted under 35 U.S.C. 154(b) by 127 days.

(21) Appl. No.: 17/031,366

(22) Filed: Sep. 24, 2020

(65) Prior Publication Data
US 2021/0086903 A1 Mar. 25, 2021

(30) Foreign Application Priority Data
Sep. 25, 2019 (EP) ..................... 19382823

(51) Int. Cl.
*B64D 15/20* (2006.01)
*B64D 47/02* (2006.01)
*F21V 5/04* (2006.01)
*F21Y 115/10* (2016.01)
*F21W 107/30* (2018.01)

(52) U.S. Cl.
CPC .............. *B64D 15/20* (2013.01); *B64D 47/02* (2013.01); *F21V 5/04* (2013.01); *B64D 2203/00* (2013.01); *F21W 2107/30* (2018.01); *F21Y 2115/10* (2016.08)

(58) Field of Classification Search
CPC ........... F21V 5/04; B64D 15/20; B64D 47/02; B64D 2203/00; F21W 2107/30
See application file for complete search history.

(56) References Cited

U.S. PATENT DOCUMENTS

| 5,354,015 A | 10/1994 | Meador |
| 5,727,863 A | 3/1998 | Pruett |
| 5,838,239 A * | 11/1998 | Stern ................. B64D 15/20 356/369 |
| 8,956,023 B1 * | 2/2015 | Hessling Von Heimendahl ......... B64D 47/02 362/470 |
| 10,136,490 B1 * | 11/2018 | Mao .................. H05B 45/20 |

(Continued)

FOREIGN PATENT DOCUMENTS

| CN | 108128468 | 6/2018 |
| CN | 108128468 A * | 6/2018 |

(Continued)

OTHER PUBLICATIONS

Shi et al., Image-based icing detector and icing detection method, 2018, CN108128468B, Espacenet, https://worldwide.espacenet.com/patent/search/family/062431332/publication/CN108128468A?q=pn%3DCN108128468B (Year: 2018).*

(Continued)

*Primary Examiner* — Rajarshi Chakraborty
*Assistant Examiner* — Michael Chiang
(74) *Attorney, Agent, or Firm* — Nixon & Vanderhye P.C.

(57) ABSTRACT

A lighting system for an aircraft including a light source configured to emit light and a refractive optical element configured to receive light from the light source and to redirect the light to produce light beams each directed to illuminate a specific surface of the aircraft or ground near the aircraft. The lighting system may be used in a method to monitor ice accretion on a surface of an aircraft.

17 Claims, 2 Drawing Sheets

(56) References Cited

U.S. PATENT DOCUMENTS

| | | | |
|---|---|---|---|
| 10,160,550 B1* | 12/2018 | Somanath | G06V 20/41 |
| 2011/0164429 A1 | 7/2011 | Heym et al. | |
| 2016/0334263 A1* | 11/2016 | Harter | G01F 23/2885 |
| 2018/0084620 A1* | 3/2018 | Klein | B64D 47/06 |
| 2018/0334263 A1* | 11/2018 | Hessling-Von Heimendahl | B64D 47/06 |
| 2019/0291894 A1* | 9/2019 | Hessling-Von Heimendahl | B64C 5/02 |
| 2020/0275540 A1* | 8/2020 | O'Kell | B60Q 3/43 |

FOREIGN PATENT DOCUMENTS

| | | |
|---|---|---|
| CN | 207599473 | 7/2018 |
| EP | 1 027 249 | 8/2000 |
| EP | 2 985 227 | 2/2016 |
| GB | 2 372 091 | 8/2002 |
| WO | 2005/001330 | 1/2005 |
| WO | 2018/091901 | 5/2018 |

OTHER PUBLICATIONS

Extended Search Report for EP19382823.3, dated Feb. 24, 2020, 11 pages.
'Code of Federal Regulations (US) Title 14—Aeronautics and Space: Chapter I,—Federal Aviation Administration, Department of Transportation; Subchapter C—Airport: Transport Category Airplanes; Subpart F-Equipment: Subjgrp-Lights Section 25.1401—Anticol, Jan. 1, 2012, 2 pages.

\* cited by examiner

LIGHTING SYSTEM FOR AN AIRCRAFT WITH MULTICHANNEL LENS

RELATED APPLICATION

This application claims priority to European Patent Application EP 19382823-3, filed Sep. 25, 2019, the entirety of which is incorporated by reference.

TECHNICAL FIELD

The present invention belongs to the field of lighting systems in the aircraft industry. In particular, the present invention provides a lighting system for illuminating different surfaces of an aircraft and arears near the aircraft using a single light source.

This invention likewise relates to the field of monitoring ice accretion on a surface of an aircraft. In particular, the present invention provides a system and a method to monitor ice accretion by using a lighting system and imaging technology.

BACKGROUND

Aircraft operate in all types of weather, in daylight and at night, and on the ground and in flight. Similarly, external lights on an aircraft must provide lighting in all types of weather, all times of a day, and on the ground and in flight. The lighting sources on an aircraft perform various functions, such as illuminating a cargo bay and a loading area, the wing and engine nacelles, and providing visual indication of an emergency situation (Glide Emergency Light).

To meet the requirement to provide adequate lighting for an aircraft, it is conventional to mount many light sources to external and internal surfaces on an aircraft and orient each of the light sources to illuminate a specific surface of the aircraft or the ground surrounding the aircraft. Having many lighting sources each dedicated to illuminate specific surfaces or areas requires complex on-aircraft lighting systems. Also subsidiary equipment, such as wiring harnesses, connectors for wiring and lighting source and power sources, is needed for each of the lighting sources. The many lighting sources and subsidiary equipment creates disadvantages by adding to the complexity of a design of an aircraft, aircraft weight, power consumption, electrical noise, engineering complexity, manufacturing, and maintenance costs and maintenance hours.

SUMMARY OF THE INVENTION

The present invention reduces the number of lighting sources needed on an aircraft by using an optical element to divide light from a single light source into light beams. Each light beam is directed to illuminate a different surface region of the aircraft or area of ground near the aircraft. The invention effectively multichannel a light source to perform the same functions that previously required many light sources.

The invention may be embodied as a lighting system for an aircraft comprising: a light source configured to emit light, and at least one refractive optical element configured for receiving light from the light source and redirect the light received from the light source as a plurality of light beams, wherein each light beam is directed to a different surface on the aircraft or area of the ground near the aircraft.

The invention may be embodied as a lighting system having a single light source and a single refractive optical element that creates a plurality of light beams from the light generated by the single light source. The refractive optical element directs the light beams to simultaneously illuminate different surfaces of the aircraft and/or ground areas surrounding the aircraft. The invention reduces the number of light sources needed to illuminate in an aircraft, and thereby reduces the complexity and number of components of a lighting system for an aircraft. Several lighting systems embodying the invention may be mounted on an aircraft such that each of the lighting systems illuminate multiple surfaces of the aircraft or area near the aircraft.

The light source may be housed in a compact module that may not be at the same location as the surfaces on the aircraft to be illuminated by the light source. From the compact module, the light source projects light to the refractive optical element that may be mounted to an external surface of the aircraft. The refractive optical element splits the light into separate light beams each of which are directed to illuminate a specific surface of the aircraft or area near the aircraft.

Housing the lighting source in a compact module remote from a surface or section from which light is projected provides design freedoms that can result in simpler lighting system designs and provides design versatility especially when dealing a restrictive space and geometric requirements from a location on an aircraft requiring lighting. Therefore, a lighting system embodying the present invention provided with the compact housing allows easy and simple implementation of the light system in a desired location of the fuselage, even in those locations disregarded by traditional lighting schemes due to the penalty associated with high number of elements such as harnesses, connectors or power sources that must be dealt with when designing the illumination scheme of an aircraft.

Further, a plurality of lighting systems according to the present invention can be installed in strategic locations on one or both sides of the fuselage according to the illumination scheme required.

An embodiment of the lighting system can be set to illuminate simultaneously at least two of the following: a wing, a nacelle/engine, the horizontal tail plane, the vertical tail plane, the cargo and/or loading areas when the aircraft is on the ground, etc.

The present invention may be embodied to provide a reliable and versatile lighting system that may be deployed such that a single light source illuminates various surfaces of the aircraft. The illuminated surfaces allow the crew/pilot to monitor the integrity of the aircraft even under low visibility conditions. Therefore, the crew/pilot can react promptly to any anomaly that may occur, such as ice accretion on the aircraft surfaces.

The lighting system of the invention may be embodied to allow using a single light source to illuminate different locations of an aircraft simultaneously and thereby reducing the external light sources needed at the aircraft fuselage.

The present invention may be embodied to reduce the lighting sources needed in a lighting system(s) of an aircraft which reduces the weight and space needed for the lighting system. Reducing lighting sources also reduces maintenance costs and electrical power consumption associated with the aircraft.

The lighting system may further comprise at least one optical guide element configured to create at least one optical channel from the light source to the at least one refractive optical element.

The optical guide element may be a waveguide configured to define and control the amount of light received by the refractive optical element. Elements of the waveguide may include, alone or in combination: fiberglass, collimators, reflectors and free-space optics.

The light source may comprise at least one light emitting diode (LED), such as at least one high intensity LED. A plurality of LEDs may be controlled individually and/or in groups so that any number of the plurality of LEDs are activated to illuminate at the same time. In some embodiments, the plurality of light sources—such as LEDs for example—can be actuated individually and/or in groups so that any number of the plurality of light sources may be oriented individually and/or in groups.

The at least one refractive optical element may include at least one multichannel lens. A multichannel lens is a lens that receives a light beam and redirects the light into two or more separate light beams. A multichannel lens may have a single complex lens which comprises a light reception side and a light emitting side. The multichannel lens may be shaped to include a plurality of geometries in the light reception side. The multichannel lens may have planar surfaces and lobes at the light reception side. Lobes are regarded as curved or rounded projections. Planar surfaces may be configured to allow part of the received light pass through the lens towards the light emitting side without modifying its direction. The lobes are shaped to gather and focus other parts of the received light in directions particular to each lobe through the light emitting side and thereby forms a plurality of light beams. For example, the lobes may be shaped to have a semi-spherical surface or concave surface on the light emitting side.

The spatial distribution of the planar surfaces and lobes within a multichannel lens may be shaped to produce light beams directed in specific directions. The different lobes and planar surfaces may be disposed at different geometric planes and regions of the multichannel lens, such as at the light receiving side of the lens.

The light emitting side of the multichannel lens may be shaped to conform to an outer surface of the fuselage where the lighting system is located. The emitting side of the multichannel lens may form a continuous surface with the outer surface of the fuselage that does not have discontinuities at the junction of the lens and the surface. Having continuous surfaces between the multichannel lens and the surface of the fuselage reduces aerodynamic drag and improves the aerodynamic performance of the surface.

The light source in the lighting system may be configured to emit a single diverting first light beam, the refractive optical element includes a light receiving surface oriented to receive the first light beam and a light emitting surface opposite to the light receiving surface, and the light receiving surface includes a first lobe and planar surface, wherein the first lobe is shaped to refract the first light beam into a second light beam passing through the light emitting surface towards a first surface of the aircraft and the planar surface is oriented to direct the first light beam as a third light beam passing through the light emitting surface and towards a second surface of the aircraft separated from the first surface. The first and second light beams do not overlap and are emitted simultaneously from the refractive optical element.

The compact configuration of a lighting system embodying the invention reduces the space needed in the aircraft for the lighting system. In particular, the single lighting source and multichannel capabilities of the refractive optical surface allows the space needed for the system to be minimized and the total weight to be reduced, as compared to a conventional lighting system(s).

In a second embodiment, the invention provides an ice monitoring system for an aircraft, the ice monitoring system comprising: a lighting system having a single light source and a multichannel lens, a thermal sensor, such as an infrared camera and/or a temperature sensor, configured to capture thermal information of a surface of the aircraft illuminated with the lighting system, and a controller, wherein the thermal sensor generates data signals indicating the thermal condition of the sensor and sent to the controller and the controller uses the data signals to determine the presence of ice on the surface of the aircraft, and the controller activates the lighting system to illuminate the surface of the aircraft in response to the determination of the presence of ice on the surface of the aircraft.

Ice accretion on aerodynamic surfaces is a problem of especial relevance in the aircraft industry. Ice can contribute to airflow separation over a leading edge of a wing or other aerodynamic surface. Airflow separation can reduce aerodynamic performance, loss of aerodynamic lift, altered controllability of the aircraft and lead to stalling of a wing which can resulting in loss of control of the aircraft.

Ice accumulation on a wing is difficult to see from a cockpit in poor visibility conditions, especially at night. It is difficult for the aircrew to see ice accumulation on a wing.

The thermal sensor gathers thermal information of a surface of the aircraft, such as surface temperature, surface emissivity, surface reflectivity, surface transmittance, surface absorption of incident light, or other parameters that indicate the presence of ice on said surface.

When ice is detected on a surface of the aircraft, the ice monitoring system may automatically illuminate the surface using the lighting system and issue an alert to the crew or pilot such as in the cockpit. Illuminating the surface allows the crew or pilot to better visually inspect the wing and assess whether there is ice accumulation. The thermal sensor may also be used to detect other thermal-related anomalies, such as a fire in the engines. A thermal sensor, such as mounted to an engine nacelle, may be incorporated into the ice monitoring system and provide a signal in response to a high temperature reading that causes the controller to activate the light source and illuminate the engine nacelle.

The thermal sensor may be replaced or combined with other types of ice sensing devices.

The ice monitoring system may also include an imaging device, such as a camera, configured to capture visual information of the surface of the aircraft. The imaging device is configured for provide the controller with a data signal, such as an image of the surface, that provides image information of the surface of the aircraft.

The ice monitoring system allows for live monitoring of ice formation on the surface of the aircraft, thus resulting in increased safety and without the need of additional assistance from crew.

The ice monitoring system may further comprise a display, such as on the instrument panel of a cockpit in the aircraft. The controller may be configured to receive image data from an imaging device that obtains images of a surface of the aircraft illuminated by the lighting system. The controller sends the imaging data to the display to allow a pilot and/or aircrew to visually inspect the surface without the surface being within sight of the pilot or aircrew.

The thermal sensor may include an infrared (IR) camera or an IR photosensor for ice detection in the infrared spectrum. Since there is a fundamental relationship among emissivity, reflectivity, transmittance, and the absorption of incident light, the IR photosensor can detect a thermal difference between the exposed ice and the surrounding surface, and a difference in emissivity between the two surfaces. An advantage of an IR camera or IR photosensor is that it can be used to detect ice accumulation on a wing in fog and night-time conditions.

The invention may be embodied to detect anomalies, such as ice, debris or damage, on a surface of an aircraft. This embodiment comprises: a lighting system, an imaging device e.g., a camera, configured to capture visual information of the surface of the aircraft, a display, and a controller configured to receive an image data signal from the imaging device and provide the display with the image data signal so that a pilot or aircrew can see on the display an image of the surface. The display may be located in the cockpit and/or in the cabin of the aircraft, thus allowing the pilot/crew to be aware of an anomaly or emergency situation that could occur in a surface of the aircraft such as the wing, the nacelle, the horizontal tail plane or the vertical tail plane. The display may be a liquid crystal display (LCD) screen.

The lighting and imaging system provide visual access to one or several regions of the aircraft, regardless of the visibility conditions (fog, night-time) under which the aircraft is operating. Therefore, the pilot/crew can check the status of a surface in any situation. Specifically, the pilot/crew is provided with instant visual information in the event of willing to check the integrity of said surface due to a regular inspection or upon identification of any anomaly, such as impacts with foreign object debris or birds; dust accumulation due to flying through ash clouds; or fire in the engines.

The invention may be embodied as an ice monitoring system for an aircraft comprising: a lighting system, a thermal sensor configured for acquiring thermal information of a surface of the aircraft, and a controller: (i) receiving a signal from the thermal sensor providing thermal information of the surface of the aircraft; (ii) determining, based on the data signal, whether ice is on the surface of the aircraft, and (iii) activating the lighting system to illuminate the surface of the aircraft upon a determination of the presence of ice on the surface of the aircraft.

The invention may be embodied as a method for monitoring the presence of ice on a surface of an aircraft comprising the steps of: obtaining thermal information of the surface of the; generating a data signal comprising thermal information of the surface of the aircraft; processing the data signal comprising thermal information of the surface of the aircraft; and determining the presence of ice on the surface of the aircraft; illuminating the surface of the aircraft, upon determination of the presence of ice. The method may also illuminate the surface of the aircraft.

The method may monitor a surface of the aircraft in anticipation of the formation of ice on said surface.

The method can be applied to monitor aircraft external surfaces, such as a wing, a nacelle/engine, the horizontal tail plane, the vertical tail plane, the cargo and/or loading areas when the aircraft is on the ground, etc.

The present invention may be embodied to provide a reliable and versatile method that may be applied for monitoring and illumination of any surface of the aircraft, so that the crew/pilot can monitor the integrity of the aircraft even if it is operating under low visibility conditions. Therefore, the crew/pilot can react promptly to any anomaly that may occur, such as ice accretion on the aircraft surfaces.

The method may further capture visual information of the surface of the aircraft.

In a more particular embodiment, the method further comprises the step of displaying on a screen visual information of the surface of the aircraft.

In a particular embodiment, the step of capturing visual information of the surface of the aircraft is performed while illuminating the surface of the aircraft.

In a particular embodiment, the steps of the method are carried out by an ice monitoring system according to any of the embodiments of the second inventive aspect.

In a particular embodiment, the surface of the aircraft is the surface of the wing and/or the surface of the nacelle, and/or the surface of the vertical tail plane, and/or the surface of the horizontal tail plane.

In a fourth inventive aspect, the invention provides an aircraft comprising a lighting system according to any of the embodiments of the first inventive aspect.

In an embodiment the lighting system is installed in the fuselage of the aircraft, preferably at one side.

In a more particular embodiment, the lighting system is located between the leading edge of the wing and the cockpit.

In a more particular embodiment, the lighting system is located above the extrados of the wing.

In a particular embodiment, at least one lighting system is installed in each side of the fuselage of the aircraft.

In a more particular embodiment, at least one lighting system is installed in each side of the fuselage of the aircraft.

In a more particular embodiment, the lighting systems is located between the leading edge of the wing and the cockpit, and above the extrados of the wing.

A lighting system embodying the invention may be mounted in an aircraft to perform different lighting and surface anomaly detection functions. In particular, the aircraft will be provided with lighting capabilities which encompass: illuminating ground areas around the aircraft when it is on the ground or close to the ground; illuminating a nacelle/engine, as well as a wing of the aircraft, so that said areas/surfaces can be monitored by the crew/pilot in prevention of any anomaly that may occur.

In a particular embodiment, the aircraft further comprises: a thermal sensor configured to acquire thermal information of a surface of the aircraft, and a controller, wherein the thermal sensor provides the controller with a data signal comprising thermal information of the surface of the aircraft, and the controller is further configured for processing the data signal received from the thermal imaging means to determine the presence of ice on the surface of the aircraft, and wherein the controller is further configured for controlling the lighting system such that the lighting system is activated for illuminating the surface of the aircraft upon determination of the presence of ice on the surface of the aircraft.

In a particular embodiment, the aircraft further comprises imaging means configured for capturing visual information of the surface of the aircraft.

In a particular embodiment, the aircraft further comprises displaying means, wherein the controller is further configured for providing the displaying means with a signal comprising the visual information captured by the imaging means, preferably upon determination of the presence of ice on the surface of the aircraft.

In a particular embodiment, the displaying means is located in the cockpit of the aircraft.

In a particular embodiment, the displaying means are located in the cabin of the aircraft, thus allowing the crew to be aware of an anomaly, such as ice accretion.

In a more particular embodiment, the displaying means in the cockpit and/or cabin of the aircraft is a screen.

Advantageously, the lighting system and the imaging means provide visual access to a surface of the aircraft, regardless of the visibility conditions (fog, night-time) under which the aircraft is operating. Therefore, the pilot/crew can check the status of a surface by being provided with instant visual information of a surface on the aircraft or ground such as during a regular inspection process or in response to the detection of an anomaly, such as impacts with foreign object debris or birds; dust accumulation due to flying through ash clouds; or fire in the engines.

Upon determination of the presence of ice on a surface of the aircraft after processing the data signal provided by the thermal sensing means, the controller is configured for automatically activating the lighting system as well as for sending visual information to the displaying means, so that the pilot/crew is aware of the hazardous situation.

The invention may be embodied as a method to monitor for monitoring ice on an exterior surface of an aircraft comprising: obtain thermal information of the surface of the aircraft; generate a data signal comprising thermal information of the surface of the aircraft; processes the data signal comprising thermal information of the surface of the aircraft; determine whether ice is on the surface of the aircraft based on the processing of the data signal; and illuminate the surface of the aircraft in response to the determination of the presence of ice on the surface of the aircraft. The method may further comprise: capture visual information of the surface of the aircraft, and display on a screen visual information of the surface of the aircraft.

All the features described in this specification (including the claims, description and drawings) and/or all the steps of the described method can be combined in any combination, with the exception of combinations of such mutually exclusive features and/or steps.

SUMMARY OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION

Figure 1:
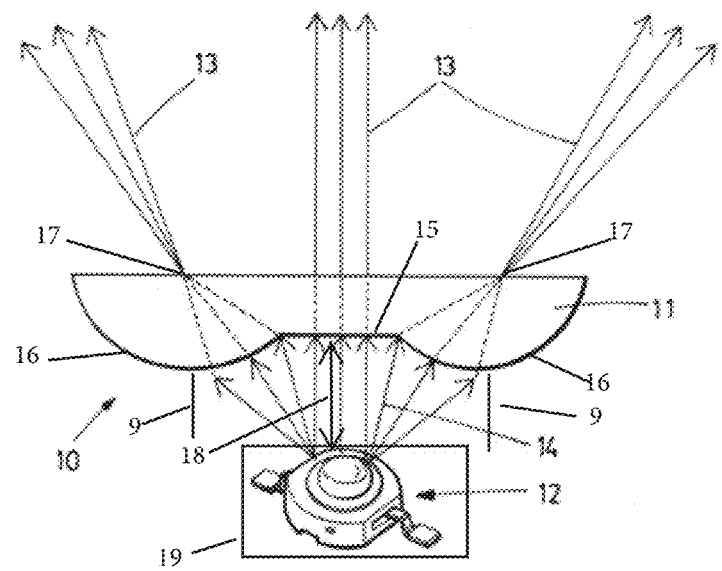
FIG. 1 illustrates a lighting system having a single light source and a multichannel lens that embodies the invention.

FIG. 1 schematically illustrates a lighting system (10) according to an embodiment of the present invention. The lighting system (10) includes a single light source (12) that emits a diverging light beam (14) in different directions and towards a refractive optical element (11). The light source may generate light such as by light emitting diodes (LEDs), incandescent lights, or compact fluorescent (CFL) lights.

The light (14) emitted by the light source (12) is depicted as several oblique straight arrows pointing towards a refractive optical element (11) which may be a multichannel lens. The light (14) may traverse a gap (18) between the light source (12) and the refractive optical element (11). The gap (18) may be a distance of, for example, one inch to two or three feet. The light source (12) may be housed in a compact module (19) positioned within a wing, fuselage or vertical or horizontal stabilizer. The light source (12) in the compact module (19) may be positioned near electrical power and control connections and mounting structures within the aircraft. The refractive optical element (11) may be at an outer edge, e.g., leading edge, or surface of the wing, fuselage or vertical or horizontal stabilizer.

The gap (18) may be used to avoid having to extend the electrical power and control connections needed to operate the light source to the surfaces on the aircraft from which the light is to be emitted. An optical guide element (9) may extend the length of the gap (18) to direct the light (14) from the light source (12) to the refractive optical element (11). The optical guide element may be a tube or channel having reflective interior surfaces, or one or more optical fibres configured to guide the light (14) from the light source (12) to the refractive optical element (11).

The refractive optical element (11) receives the diverging light beam (14) emitted by the light source (12). As shown in FIG. 1, the diverging light beam is received by the light reception side of the multichannel lens (11).

The light reception side of the multichannel lens (11) is shaped for gathering and redirecting the light received from the light source (12) to produce a plurality of light beams (13) which are emitted from the light emitting side of the multichannel lens (11) in a plurality of directions.

In this embodiment, the light emitting side is shown as a flat surface of the multichannel lens (11) from which three light beams (13), created by the multichannel lens (11) from the received light, are emitted.

The light reception side of the multichannel lens (11) comprises two lobes (16) shaped as curved surfaces and separated by a planar surface (15) which is parallel to the light emitting side of the multichannel lens (11). Each of the lobes may include a surface on the light reception side that is semi-spherical, concave or otherwise shaped such that light entering the lobe is refracted in the multichannel lens (11) to be focused to a point (17) that may be at the light emitting side of the lens. The portion of the multichannel lens corresponding to the planar surface (15) may not refract the light passing from the planar surface on the light reception side to the planar surface on the light emitting side of the multichannel lens.

Part of the diverging light beam emitted by the single light source (12) is received by the lobes (16), e.g. the curved surfaces of the lens (11). Each lobe (16) gathers and refracts the received light towards the light emitting side. Light passing through the lobe leaves the multichannel lens (11) as a directed light beam separate from light passing through the other lobe(s) or the planar surface (15).

Further, part of the diverging light beam emitted by the single light source (12) is received by the planar surface (15) which is parallel to the light emitting side. Then, the light travels in a perpendicular direction from the planar surface towards the light emitting side of the multichannel lens (11) and a light beam is then emitted from said emitting side of the multichannel lens (11).

Thus, the lighting system (10) according to this particular embodiment produces three light beams (13) in different directions suitable for illuminating different areas, using the light received from a single light source (12).

FIG. 1 depicts a of multichannel lens (11) creating and emitting three different light beams (13), each directed towards a surface or area to be illuminated The lobes (16) and planar surface(s) 15) of the multichannel lens (11) may be located at different elevations of the light receiving side of the lens to achieve the desired light beam direction and shape to be emitted from the light emitting side of the lens. The lobes and planar surfaces of the light reception side of the multichannel lens (11) may be shaped for redirecting light and emit beams in light beam directions and light beam shapes that are configured to illuminate specific surfaces of the aircraft or ground near the aircraft.

Other embodiments of multichannel lens according to the invention may comprise two, three or more portions to produce two, three or more light beams (13) from the light received from the light source. The multichannel lens may thus have different shapes or sizes, adapted to specific requirements. Similarly, the optical properties of the material(s) forming the multichannel lens (11) may be selected to achieve certain light beam direction and shapes to be emitted from the light emitting side of the lens.

Figure 2:
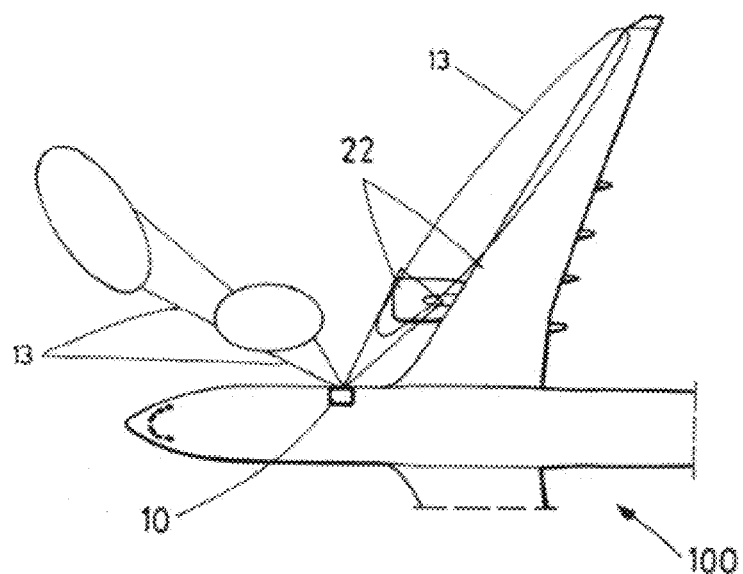
FIG. 2 is a top plan view of an aircraft comprising the lighting system shown in FIG. 1.

FIG. 2 shows a top plan view of an aircraft (100) provided with a lighting system (10) according to an embodiment of the present invention. In particular, the system (10) is located in the right side of the aircraft (100), mounted on the fuselage, forward of the leading edge of the wing, and above the root chord of the wing. The system (10) is shown in an operative mode, emitting three different light beams (13) which are depicted illuminating simultaneously three different areas of the surrounding airfield. One of the light beams (13) is represented illuminating two different surfaces (22) of the aircraft, namely an engine nacelle and the wing. The other two light beams (13) are depicted illuminating two different areas of the surroundings of the aircraft. In particular, those two illuminated areas provide the crew with better visibility conditions for operating when the aircraft is on the ground.

Figure 3:
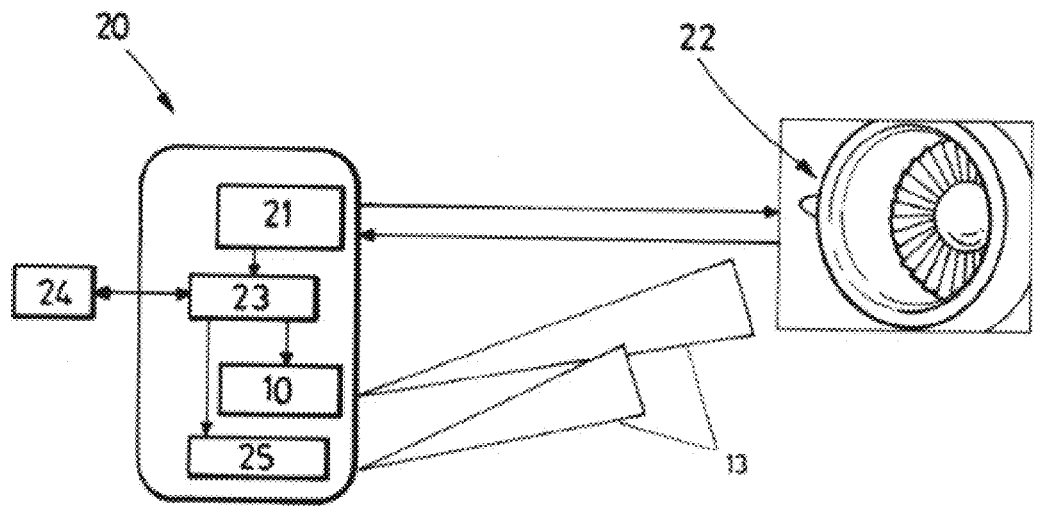
FIG. 3 is a schematic representation of an ice monitoring system embodying the invention wherein the system mounted the aircraft, such as on portion of the fuselage forward of an engine and the system monitors an engine nacelle.

FIG. 3 represents schematically a diagram showing how the elements of an ice monitoring system (20) according to an embodiment of the present invention are related. In particular, the system (20) comprises a thermal sensing means (21) such as an infrared (IR) camera, a controller (23), a lighting system (10) according to an embodiment of the first inventive aspect, an imaging means (25) and a displaying means (24). The imaging means may be a camera that captures digital images of a leading edge of a wing or other aerodynamic surface that may be subjected to icing. The display means may be a display, such as a computer monitor, in a cockpit which displays the images captured by the imaging means.

The system (20) is depicted monitoring an engine nacelle (22). In particular, according to the present embodiment, the thermal sensing means (21) is an IF camera (21) capturing thermal information of the engine nacelle (22). Said information is provided as a data signal to the controller (23) which, in turn, is configured for processing said data signal to determine if ice is accumulating on the engine nacelle (22).

Upon determination of ice accumulation on the engine nacelle (23), the controller is configured for turning the lighting system (10) into an operative mode wherein the system (10) illuminates the engine nacelle (22). Further to the activation of the lighting system (10), the controller (23) activates the imaging means (21). In this particular embodiment, the imaging means (21) is a video camera (21) configured for recording visual information of the engine nacelle (22). The video camera (21) provides said visual information as a data signal to the controller (23).

The controller (23) provides the visual information to a remote displaying means (24) which, in this particular embodiment, is a screen installed in the cockpit, for allowing the crew to monitor ice accumulation on the engine nacelle (22).

Figure 4:
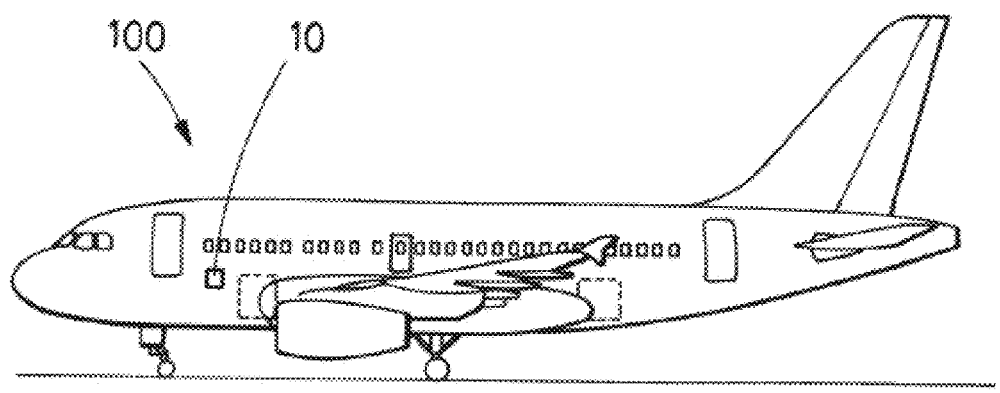
FIG. 4 shows an aircraft including a lighting system embodying the invention

FIG. 4 shows an aircraft (100) comprising a lighting system (10) according to the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A lighting system for an aircraft comprising:
a light source within the aircraft;
a refractive optical element mounted to or embedded in an exterior surface of the aircraft, wherein the refractive optical element is configured to receive light from the light source and direct the light into separate light beams, wherein each of the separate light beams is directed by the refractive optical element towards an exterior surface of the aircraft or towards ground, and
an optical guide element within the aircraft and configured to guide light from the light source to the refractive optical element,
wherein the optical guide element is in a gap within the aircraft and between the light source and the refractive optical element and the gap is at least one foot.

2. The lighting system according to claim 1, wherein the optical guide element spans the gap between the light source and the refractive optical element.

3. The lighting system according to claim 1, wherein the light source comprises at least one light emitting diode (LED).

4. The lighting system according to claim 1, wherein the at least one refractive optical element comprises at least one multichannel lens.

5. The lighting system according to claim 1, wherein:
the light source is configured to emit a single diverting first light beam,
the refractive optical element includes a light receiving surface oriented to receive the first light beam and a light emitting surface opposite to the light receiving surface, and
the light receiving surface includes a first lobe and planar surface, wherein the first lobe is shaped to refract the first light beam into a second light beam passing through the light emitting surface towards a first surface of the aircraft and the planar surface is oriented to direct the first light beam as a third light beam passing through the light emitting surface and towards a second surface of the aircraft separated from the first surface.

6. The lighting system of claim 5, wherein the second and second third light beams do not overlap and are emitted simultaneously from the refractive optical element.

7. An ice monitoring system for an aircraft comprising:
the lighting system of claim 1, wherein at least one of the separate light beams is directed to the exterior surface which is a susceptible to icing;
a thermal sensor configured to acquire thermal information of the exterior surface of the aircraft, and
a controller configured to receive data indicating the thermal information, use the data to determine whether ice is on the exterior surface and activate the lighting system to illuminate at least part of the exterior surface in response to a determination of ice on the surface.

8. The ice monitoring system according to claim 7, further comprising an imaging system configured capture visual information of the surface of the aircraft.

9. The ice monitoring system according to claim 8, further comprising a display and the controller is configured to cause the display to show the visual information of the surface.

10. The ice monitoring system according to claim 7, wherein the thermal sensor comprises an infrared camera.

11. An aircraft comprising:
a leading edge of an aerodynamic surface;
a light source mounted within the aircraft and configured to generate a first light beam along a first light path, and
a refractive optical element embedded in or mount on an exterior surface of aircraft, the refractive optical element having a light receiving surface in the first light path and configured to receive the first light beam and split the first light beam in to at least a second light beam and a third light beam, wherein the second light beam illuminates the leading edge and the third light beam illuminates another surface of the aircraft which is separate from the leading edge;
an optical guide element configured to guide light from the light source to the refractive optical element, wherein the optical guide element is in a gap between the light source and the refractive optical element and the gap is at least one foot;
a thermal sensor configured to acquire thermal information of the leading edge and generate a data signal comprising thermal information of the leading edge, and
a controller configured to receive the data signal, analyze the data signal to determine the presence of ice on the surface of the aircraft, and activate the light source to illuminate the surface in response to the determination of ice on the surface.

12. The aircraft according to claim 11, further comprising a camera configured for capture an image of the leading edge.

13. The aircraft according to claim 11, further comprising a display configured to display the image captured by the camera.

14. The aircraft according to claim 11, wherein the refractive optical element is a multichannel lens.

15. The aircraft according to claim 14, wherein the light receiving side of the multichannel lens includes a planar surface and a lobe, and the lobe is shaped to refract the first beam to form the second light beam and the planar surface passes the first light beam through multichannel lens and emit the first light beam as the third light beam.

16. The aircraft according to claim 15, wherein the multichannel lens includes a light emitting side which is planar, and the second and third light beams pass out of the multichannel lens at the light emitting side.

17. The aircraft according to claim 11, wherein the optical guide element spans the gap between the light source and the refractive optical element of at least one foot.

* * * * *